United States Patent [19]

Kubek

[11] 4,061,296
[45] Dec. 6, 1977

[54] BRAKING SYSTEM FOR SKI OR FLOAT EQUIPPED AIRCRAFT

[75] Inventor: John Kubek, Newberg, Oreg.

[73] Assignee: Andrew Kubek, Sr., Taylor, Mich.; a part interest

[21] Appl. No.: 641,921

[22] Filed: Dec. 18, 1975

[51] Int. Cl.² .......................................... B64C 25/42
[52] U.S. Cl. ........................................ 244/112; 188/5; 280/12 AB
[58] Field of Search ............... 244/110 R, 112, 1, 113, 244/42 D, 42 DA; 188/8, 5; 114/66.5 F, 66.5 P, 145 R, 145 A; 280/604, 605, 12 AB, 12 AA; 49/274, 346, 340; 74/102–104

[56] References Cited

U.S. PATENT DOCUMENTS

| 1,625,226 | 4/1927 | Simmons | 188/5 |
| 1,879,432 | 9/1932 | Norton | 244/112 |
| 2,099,368 | 11/1937 | Levy | 244/42 DA X |
| 2,158,686 | 5/1939 | Barnhart | 244/42 D |
| 2,183,138 | 12/1939 | Hall | 244/42 DA X |
| 2,402,379 | 6/1946 | De Ganahl | 244/112 |
| 2,462,459 | 2/1949 | Bigelow | 244/113 |
| 2,828,135 | 3/1958 | Koci | 280/605 |

FOREIGN PATENT DOCUMENTS

| 68,850 | 5/1915 | Austria | 49/346 |

*Primary Examiner*—Galen L. Barefoot
*Attorney, Agent, or Firm*—Clarence A. O'Brien; Harvey B. Jacobson

[57] ABSTRACT

A braking system for ski or float equipped aircraft which is actuated by the conventional brake system of the aircraft. The system permits normal braking operation to activate the additional components which have been added to the ski or float of the airplane. A braking member actuated by a hydraulic cylinder connected to the aircraft's original hydraulic system form the main components of this invention.

6 Claims, 7 Drawing Figures

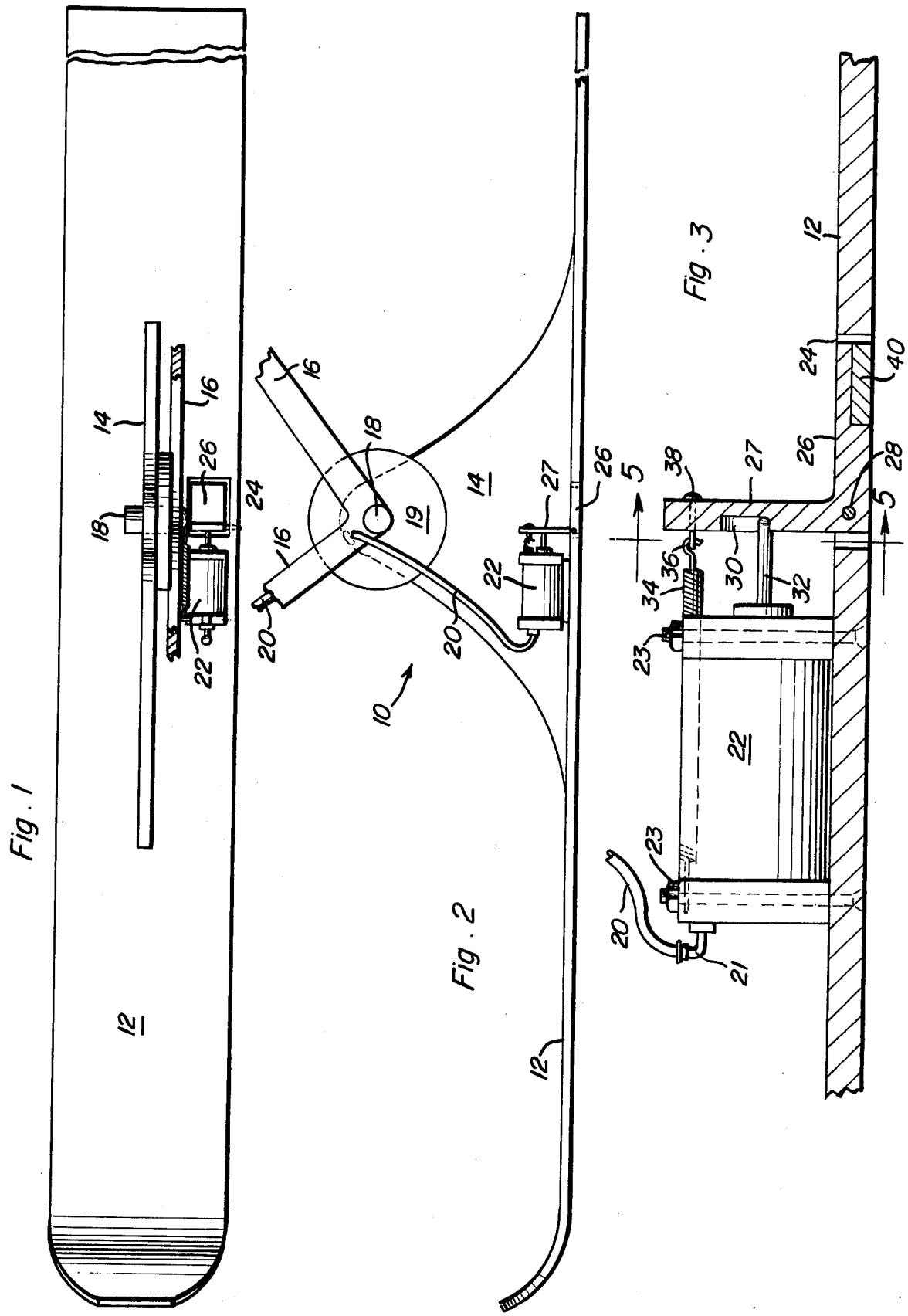

BRAKING SYSTEM FOR SKI OR FLOAT EQUIPPED AIRCRAFT

BACKGROUND OF THE INVENTION

This invention relates generally to braking devices for aircraft which are equipped with skis or pontoons.

DESCRIPTION OF THE PRIOR ART

A common problem of aircraft having skis or pontoons thereon is that when the aircraft lands on compacted snow or ice, or water, there is relatively little provision for slowing the plane down other than the normal wind drag.

Devices for braking sleds, skis, and other devices which travel on snow and ice are known, but none of them solve the problems as related to ski equipped aircraft.

Devices also are known for slowing boats and other marine vessels down when operating in water, but again none of these are readily applicable to pontoon equipped aircraft. Known prior art patents which may be pertinent to this invention are listed as follows:

C. E. Jensen et al — U.S. Pat. No. 575,956 — Jan. 26, 1897

G. L. Jacques — U.S. Pat. No. 1,101,631 — June 30, 1914

C. Simmons — U.S. Pat. No. 1,625,226 — Apr. 19, 1927

A. F. Daignault — U.S. Pat. No. 2,049,357 — July 28, 1936

H. A. Snow — U.S. Pat. No. 2,302,478 — Nov. 17, 1942

A. Cohen — U.S. Pat. No. 2,459,016 — Jan. 11, 1949

M. Koci — U.S. Pat. No. 2,828,135 — Mar. 25, 1958

SUMMARY OF THE INVENTION

An object of the present invention is to provide a braking system for use with aircraft having skis or pontoons for landing.

Another object of this invention is to provide a braking system which is light in weight for use on aircraft so as to not reduce the usable payload of said aircraft to any significant degree.

A further object of this invention is to provide a braking system for attachment to ski or pontoon equipped aircraft which is easily mounted on said aircraft and which readily connects into the existing hydraulic brake system of said aircraft for actuation thereof by the normal brake system of said aircraft.

A still further object of this invention is provide a hydraulic actuated braking component for simple, yet safe attachment to ski or pontoon equipped aircraft so as to provide braking power for said aircraft when landing on snow, ice, or water.

One of the big features of the invention disclosed herein is in the fact that the braking system set forth is extremely simple and yet very, very reliable. It is easily attached to either ski or pontoon equipped aircraft with a minimum amount of labor being involved and a minimum amount of cost.

It also is very light in weight, adding only about five pounds to the gross weight of the aircraft. This is important in an aircraft type application wherein every pound of weight must be included by the pilot in his weight and balance calculations and an extra pound of weight means one less pound of payload. The braking system as disclosed herein is extremely lightweight and yet positive in operation and safe in use.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

FIG. 1 is a top view, partly in cross section, of the braking system of this invention as applied to a ski of a ski equipped aircraft.

FIG. 2 is a side view of the brake system as attached to a ski equipped aircraft.

FIG. 3 is an enlarged view, in part and partly in cross section, of the brake system depicted in FIG. 2.

DESCRIPTION OF THE PREFERRED EMBODIMENT

Figure 5:
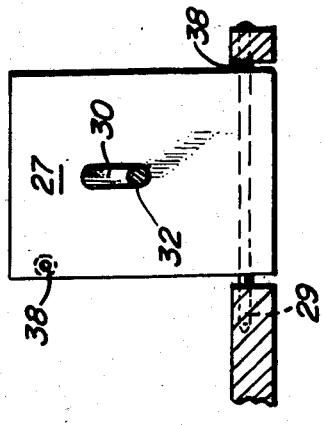
FIG. 5 is a view taken generally along line 5—5 of FIG. 3.
Figure 4:
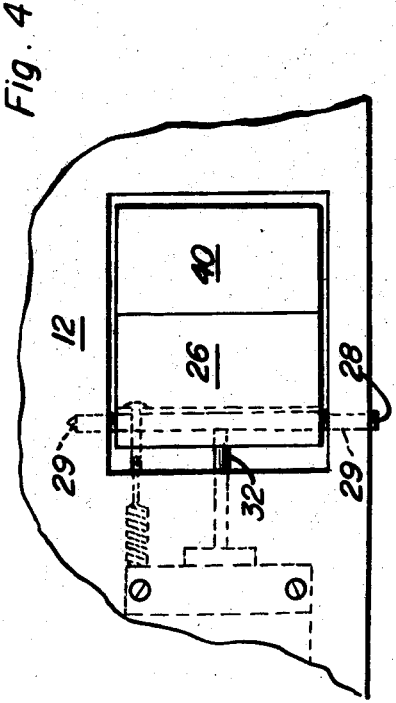
FIG. 4 is a bottom view of the enlarged section of FIG. 3.

Referring to FIG. 2 of the drawing, reference numeral 10 indicates the brake attachment of this invention as applied to a ski equipped aircraft. One of the skis 12 suspended by a mounting flange 14 from the normal landing gear structure 16 of an aircraft. An axle shaft 18 and disc 19 are also shown. The aircraft itself is not shown. The hydraulic brakeline 20 connects to the normal hydraulic brake system of the aircraft and actuation of the master cylinder by the pilot in the conventional manner will cause pressure in the line.

The primary components of the brake attachment system of this invention consists of the slave cylinder 22 which is connected to the hydraulic line 20 by conventional fitting means 21 and securely attached to the ski by any appropriate fastening means such as bolts and nuts 23 as shown in enlarged detail in FIG. 3. A rectangular hole 24 is cut or must be provided in the ski 12 for receiving the brake element of a brake member therein. Said brake member has two portions at right angles to each other a brake element 26 and an actuating arm 27 as seen in FIG. 3. In this version both of the right angle members are of approximately the same proportions with the member being pivoted at the apex thereof by means of pin 28 secured in appropriate holes 29 of the ski itself. The pin may be a press fit within said holes 29 to retain the pin therein or other appropriate fastening means may be used.

The lower rear most portion of the brake element 26, as shown in FIG. 3, preferably would be provided with a wear plate 40 of tungsten carbide or other hardwear, resistent material for increasing the life of the braking surface. The other arm portion 27 of the braking member has a cam slot 30 therein for reception of the actuating pin 32 from the hydraulic slave cylinder 22. A return spring 34 is also provided appropriately connected to the upper end of the arm portion 27 by means of hook 36 and pin 38.

The device in operation will be actuated as follows. In normal flight and landing conditions of the aircraft the retention spring 34 will maintain the lower braking element 26 with wear plate 40 in the position shown in FIGS. 1, 2 and 3, that is with the brake element 26 parallel and in line with the ski surface. Upon landing on snow and ice, once the plane has actually set down on the snowy surface, the pilot may actuate the conventional braking system of the plane which will apply hydraulic pressure to the slave cylinder 22, which in turn will extend the piston and push the plunger member 32 outwardly and through camming groove 30 of the brake member extend the retraction spring 34 and pivot the braking element 26 around the pin 28 to force the wear plate 40 against the surface of the snow. This is very, very effective in slowing the plane down and braking same. Obviously the plane is equipped with two skis and the system shown on one ski would be the same on both.

Figure 7:
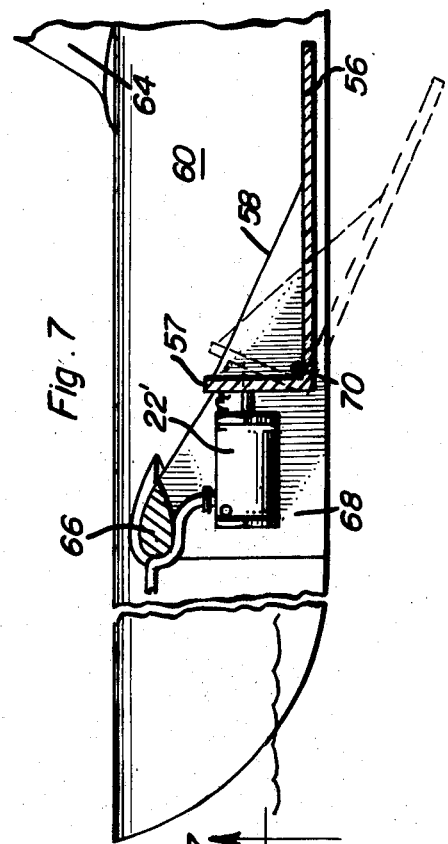
FIG. 7 is a view taken generally along line 7—7 of FIG. 6.
Figure 6:
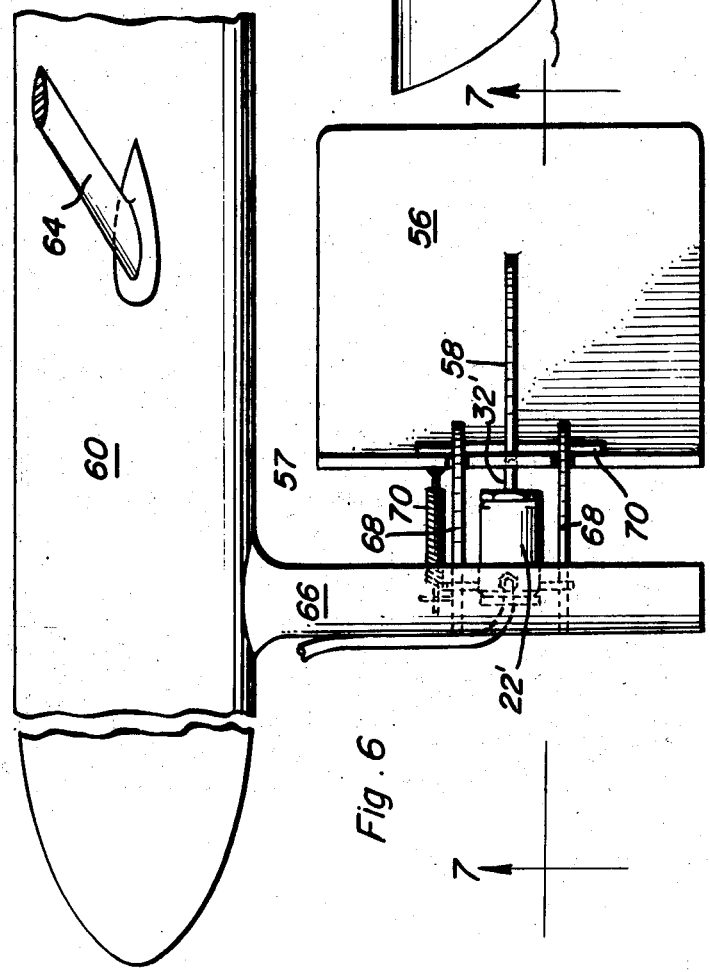
FIG. 6 is a top view of the braking system of this invention mounted on a pontoon equipped aircraft.

FIGS. 6 and 7 show a modification of the above described braking system as applied to a float equipped plane. In many northern areas of the United States and especially in places like Alaska both ski equipped and float equipped planes are the order of the day. In such areas the braking systems as disclosed herein are very, very useful. FIG. 6 shows a float 60 suspended from an aircraft by spars or struts 64 and 66. The brake attachment may be suspended from strut 66 by attaching flanges 68 and appropriate attachment means of conventional design. A slave cylinder 22' which is a substantial duplicate of the one described above is appropriately mounted to the flange members 68 by any conventional mounting means. The mounting members 68 support a pin 70 which in turn support for pivotal movement thereabout a brake member including a braking element or plate 56 with an actuating arm portion or flange 57 at right angles thereto. The actuating flange 57 is strengthen by means of a triangular support plate 58 appropriately welded to the large braking plate 56 and the smaller actuating flange 57. The actuating flange 57 has a camming groove 30' similar to the one 30 in FIG. 5 for the ski mount and is similarly actuated by a pin 32' from the hydraulic slave cylinder 22'.

As best seen in FIG. 7, when the pilot lands the aircraft on water, once the pontoons are actually riding on the surface of the water, then the braking plate 56 may be forced into the water by the pilot applying the conventional aircraft brakes and braking system to actuate the slave cylinder 22'. Again only one pontoon and one braking member is shown but normally a similar member would be used on the other side of the aircraft.

The brake attachment devices disclosed herein are made of lightweight materials, metal, plastics, etc., and add very little to the overall gross weight of the aircraft to which they are applied. They increase substantially the capabilities of the aircraft and the pilot by permiting much shorter landing spots to be effectively used with safety. This as anyone who has ever flown realizes is extremely important.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A braking system attachment for an aircraft equipped with landing gear structure comprising: means for landing on water in one of its various forms attached to the landing gear structure, a pivotally mounted brake member including a generally planar brake element, mounting structure means for attachment of said brake member to the landing gear structure, a hydraulic actuated slave cylinder mounted on said mounting structure, means for actuating the brake member from the slave cylinder, and non-hydraulic return means for the brake member to keep same in a non-actuated and non-braking position, the means for actuating the brake member from the slave cylinder including a pin connected directly to the piston of the slave cylinder and an elongated cam slot provided in the brake member for direct actuation by said pin, said cam slot comprising an elongated groove formed in and extending lengthwise of an arm portion of the brake member extending at generally right angles relative to the brake element and the pivot axis of said brake member, said pivot means including pivot pin means supporting the brake member at the juncture of the arm portion and brake element.

2. The structure as defined in claim 1, wherein the return means for the brake member includes a resilient return spring connected externally of the hydraulic actuated slave cylinder and between the brake member and the mounting structure means.

3. The structure as set forth in claim 2, being attached to an aircraft in which said means for landing on water in one of its various forms attached to the landing gear structure includes two skis mounted thereon, and said brake member is appropriately mounted within a rectangular opening in each of said skis.

4. The structure as set forth in claim 2, wherein the means for landing on water in one of its various forms attached to the landing gear structure includes aircraft supporting pontoons on struts and the brake mounting structure means is appropriately attached on the aircraft struts closely adjacent to the pontoons attached thereto.

5. A brake device attachment for aircraft comprising:
   a. a mounting structure for attachment to the landing support means of said aircraft,
   b. a hydraulic slave cylinder secured to said mounting structure,
   c. pivot means on said mounting structure; and,
   d. a braking member mounting for pivotal movement on said pivot means, all together with a return spring means for keeping the brake member in a non-braking position at all times when the hydraulic slave cylinder is unactuated, said return spring means being external to the hydraulic system, together with a hydraulic connection of the slave cylinder to the conventional hydraulic brake system for the aircraft, the braking member comprising a large rectangular plate which is disposed about the pivot means so that a large braking surface is exposed when the slave cylinder is actuated, together with a cam slot on the braking member structure for actuation by a camming pin directly from the slave cylinder unit, said cam slot comprising an elongated groove provided in a portion of the braking member which extends at right angles from the large rectangular plate, said pivot means including pivot pins supporting the braking member at the right angle junction of the camming portion of the brake member and the large rectangular plate of the brake member.

6. The structure as set forth in claim 5, wherein the return spring means includes a resilient return spring connected at one end to the mounting structure and at the other end to the right angle portion of the braking member.

* * * * *